(12) United States Patent
Drewes

(10) Patent No.: US 9,586,569 B2
(45) Date of Patent: Mar. 7, 2017

(54) METHOD FOR SECURING THE BRAKING EFFECT OF A BRAKE

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 118 days.

(21) Appl. No.: 14/405,318

(22) PCT Filed: May 31, 2013

(86) PCT No.: PCT/EP2013/061222
§ 371 (c)(1),
(2) Date: Dec. 3, 2014

(87) PCT Pub. No.: WO2013/182480
PCT Pub. Date: Dec. 12, 2013

(65) Prior Publication Data
US 2015/0134217 A1    May 14, 2015

(30) Foreign Application Priority Data
Jun. 6, 2012   (DE) .................. 10 2012 209 519

(51) Int. Cl.
*B60T 8/172* (2006.01)
*B60T 17/22* (2006.01)
(Continued)

(52) U.S. Cl.
CPC .............. *B60T 17/221* (2013.01); *B60T 7/12* (2013.01); *B60T 8/172* (2013.01); *B60T 17/18* (2013.01);
(Continued)

(58) Field of Classification Search
CPC ..... B60T 8/00; B60T 7/12; B60T 7/22; B60T 13/66; B60T 13/74; F16D 55/00; F16D 65/00
See application file for complete search history.

(56) References Cited

U.S. PATENT DOCUMENTS 6,671,604 B1*  12/2003  Frentz ............... B60T 8/00
                                                   180/197
2006/0273658 A1*  12/2006  Halassy-Wimmer ..... B60T 7/12
                                                   303/191

(Continued)

FOREIGN PATENT DOCUMENTS

DE         4024078         1/1992
DE         19911902        8/2000
(Continued)

OTHER PUBLICATIONS

DE 102011080789 A1_english Abstract, STAAB 2012.*
European Patent Office, International Search Report, Nov. 5, 2013.

*Primary Examiner* — Jelani Smith
(74) *Attorney, Agent, or Firm* — Price Heneveld LLP

(57) ABSTRACT

A method for securing the braking effect of a brake includes a brake contact surface and a one brake pad including a friction surface, wherein a braking effect therebetween is caused by a braking pressure acting therebetween, the method including capturing the braking effect of the brake, attributing the braking effect to a friction parameter of the friction surface in a calculation unit, and comparing the friction parameter of a marginal braking effect in a comparator, wherein a signal is output to the brake when it falls below the marginal braking effect, which signal causes a braking pressure and a friction force between the brake contact surface and the friction surface directly and/or indirectly by pressure build-up, whereby the friction parameter of the friction surface is brought above the marginal braking effect when the braking pressure and the friction force on the friction surface and/or the brake contact surface obtain a material removal and/or a heat input, by which the relation between braking effect and braking pressure can be increased.

25 Claims, 2 Drawing Sheets

(51) Int. Cl.
*B60T 7/12* (2006.01)
*B60T 17/18* (2006.01)

(52) U.S. Cl.
CPC ....... *B60T 2210/12* (2013.01); *B60T 2270/86* (2013.01)

(56) References Cited

U.S. PATENT DOCUMENTS

2007/0191997 A1* 8/2007 Isaji ..................... B60T 7/22
 701/1
2007/0213911 A1* 9/2007 Trombley ........... B60T 8/17558
 701/70

FOREIGN PATENT DOCUMENTS

| | | | |
|---|---|---|---|
| DE | 10137273 | 3/2002 | |
| DE | 10257839 | 7/2004 | |
| DE | 10320175 | 12/2004 | |
| DE | 102005060024 | 6/2007 | |
| DE | 102011080789 A1 * | 2/2012 | .......... B60T 8/17558 |
| DE | 102010043320 | 5/2012 | |
| EP | 1157908 | 11/2001 | |
| EP | 1832480 | 9/2007 | |
| EP | 2101077 | 9/2009 | |
| GB | 2363436 | 12/2001 | |
| WO | 0214130 | 2/2002 | |
| WO | 03069181 | 8/2003 | |
| WO | 2004101338 | 11/2004 | |
| WO | 2005100114 | 10/2005 | |

\* cited by examiner

METHOD FOR SECURING THE BRAKING EFFECT OF A BRAKE

BACKGROUND OF THE INVENTION

The present invention relates to a method for securing the braking effect of a brake, in particular of a utility vehicle or commercial vehicle, in driving mode.

Brakes or brake pads have the problem of so-called "fading" or "glazing". "Fading" of the brake pads means a significant drop of the friction coefficient when the wheel brakes are used not very often. This may occur when a tractor vehicle is equipped with a retarder, for example. As a consequence, the braking effect or braking power drops significantly and in part irreversibly. Consequently, in order to provide the desired braking power, the brake pads need to be replaced even though the wear limit has not yet been reached. Equally problematic is that the braking power, which was assumed when dimensioning the vehicle, is not available when needed. This is a problem in particular in the case of emergency brake applications or in connection with road handling control or driver assistance systems (active distance control etc.), since the control of such systems is also based on a sufficient vehicle retardation and, thus, braking power by the wheel brakes. The manufacturers of axles and braking systems only give recommendations to parametrize the braking systems, in particular the electronically controlled braking systems (EBS) accordingly. Moreover, the drivers are instructed to regularly actuate the wheel brakes. In practice, the recommendations for parametrizing lead in part to problems due to the highly different vehicle configurations and partly different legal provisions. The regular actuation of the brakes by the driver is not process safe due to the human influence.

Thus, the object underlying the invention is to provide a method for securing the braking effect of a brake, in particular of a commercial vehicle, in driving mode, which method maintains at a minimum level the level of the friction coefficient of friction pairs, in particular of brake pads or brake linings, over the entire service life of the friction partners, thus avoiding so-called "fading" or "glazing" of the brake pads.

SUMMARY OF THE INVENTION

According to the invention, a method for securing the braking effect of a brake, in particular of a utility vehicle, in driving mode, wherein the brake comprises at least one brake contact surface and at least one brake pad comprising a friction surface, wherein the braking effect between the brake contact surface and the friction surface unfolds as a result of a braking pressure acting between said brake contact surface and said friction surface, comprises the following steps:
  capturing the braking effect of the brake;
  attributing the braking effect to a friction parameter of the friction surface in a calculation unit;
  comparing the friction parameter of a marginal braking effect or limit braking effect in a comparator, wherein a signal is output to the brake when it falls below the marginal braking effect, which signal causes a braking pressure and a friction force between the brake contact surface and the friction surface indirectly and/or directly by a pressure build-up, whereby the friction parameter of the friction surface is brought above the marginal braking effect due to the fact that the braking pressure and the friction force on the friction surface and/or the brake contact surface obtain a material removal and/or a heat input, by which the relation between braking effect and braking pressure can be increased.

Thus, the method makes it possible to increase again the braking effect while the braking pressure remains the same. The brakes are preferably disc and/or drum brakes. Preferably, one or more brakes are combined within one braking system. Preferably, the braking system consists of a combination of disc brakes and/or drum brakes or in general of different brake types. Further preferably, only one single brake type is used within a braking system as well. The different applications and embodiments also make it clear that it is not decisive that the brake contact surface and/or the friction surface is/are formed flat, as is the case in a disc brake, for example. Equally preferably, the brake contact surface and/or the friction surface can be designed curved, such as in a drum brake. Further preferably, the brake is part of an electronically controlled braking system (EBS). Expediently, the capturing of the braking effect or also of the braking power of the brake is based on the idea that the data of an electronic braking system, which can be captured already today, in particular the vehicle retardation in dependence on the braking pressure, possibly also the cylinder stroke and the geometric parameters from the brake calculation, may be used in order to indirectly determine the level of friction coefficient of the friction pairing, i.e., to put it differently, the braking effect of the brake, and to early recognize the tendency of a drop of the friction coefficient over the time. The frequency of the brake applications and the pressure level of the brake applications may also be used as criteria to initiate the method for securing the braking effect, thus, to put it differently, to start an automatic activation program for the brake pads. Preferably, the attribution of the braking effect to the friction parameter of the friction surface in a calculation unit is not limited to the friction surface only. The friction parameter rather reflects the interaction between the friction surface(s) and the brake contact surface(s). The friction parameter thus captures properties of the friction pairing. Further preferably, the calculation unit provides at least one storage unit, by means of which data such as friction parameters, particularly preferably also over the time, can be stored. Also preferably, also operational profiles and the above-mentioned capturable data of the (electronic) braking system etc. are stored. The background is that this makes it possible for the calculation unit to develop tendencies for a drop of the friction coefficient, i.e. to put it differently, to precalculate such tendencies. This is done by processing the stored data as well as the data of the (electronic) braking system, preferably in real time, for example by sensors etc. It is particularly preferable if sensors already existing or present in the vehicle can be used so that no new sensors are installed specifically for the method for securing the braking effect. Preferably, the marginal braking effect represents a value, to put it differently a friction parameter, which advantageously should not be undercut. As a matter of course, it may be advantageous to hold available a plurality of such marginal braking effects. For example, the marginal braking effect may be influenced by the age of the friction surface and/or brake contact surface, the materials used, the operational profile, the field of use of the vehicle (hot land, cold land, taking into account of geodetic parameters such as height) and the like. Preferably, also marginal braking effects in different stages are held available. Thus, the stages may cover uncritical to very critical conditions, for example. It is further preferred to define also a marginal brake sphere, within which a safe operation of the brake can be ensured. To put it differently, thus, safe operating states or fallbacks can be provided, or also a final value, which by no means may be undercut. Preferably, the signal output to the brake is a control device signal. Finally, this means that the method for securing the braking effect of a brake can be implemented preferably within a control device of a vehicle, such as an engine control device or motor control device or a brake control device. Here, it is irrelevant whether the method is provided as an individual module and then installed or whether it is directly integrated into existing structures. The direct forwarding of the signal can be carried out such that the signal is forwarded so to speak directly to a brake, where it can be further processed. By contrast, the indirect forwarding could be carried out such that the signal is prepared in a brake control device, and only from there it is passed on to the brake etc. It is very advantageous if said method runs by itself, to put it differently automatically. The driver should neither initiate the pressure build-up nor notice it. Nevertheless, it may be advantageous to generate an alarm signal showing to the driver the wear condition of the brake. Preferably, the pressure build-up, which by means of the braking pressure causes the friction force between the brake contact surface and the friction surface, is done by building up an oil or air pressure. Thus, preferably, hydraulic or pneumatic braking systems are used. However, the method is not limited to such methods, but may also be used for systems, which are actuated by a Bowden cable, for example. The material removal takes place preferably on the friction surface of the brake pad since the latter is generally softer. The material removal advantageously may also take place on the brake contact surface, for example in order to remove a rust film or also other particles, which are present on the brake contact surface or have baked there. Also preferably, material is removed both from the friction surface and from the brake contact surface. Preferably, the material removal is carried out on the friction surface such that the "faded" or "glazed" layer is removed, i.e. erased, or also ground off, by means of friction. Expediently, said material removal frees fresh friction surface material so to speak. Depending on the material of the friction surface or of the brake pad, also the heat input generated by the friction force and by the braking pressure may be used to change the inner structure of the brake pad, down to the molecular level, such that the friction parameter and, thus, the relation between braking effect and braking pressure increases. It is advantageous, for example, if the brake pad or its friction surface gets softer again by the heat input since this should increase the friction parameter (of the friction surface).

Advantageously, the method additionally comprises the following step:

Providing a marginal speed value of a vehicle and regulating the pressure build-up such that, despite the braking pressure acting between the brake contact surface and the friction surface, the actual speed of the vehicle will not fall below the marginal speed value.

Thus, preferably, a brake intervention is carried out such that the driver will not notice said brake intervention. Expediently, to this end a speed signal of the vehicle or a rotational speed signal of the brake disc is evaluated or read out and compared to a marginal speed value, such as the driving speed of the vehicle or the rotational speed of the brake disc. Depending on the field of application of the vehicle or the operational profile thereof, different marginal speed values can be fixed. It may also be of advantage to fix a certain range for a marginal speed value, which may not be undercut when the brake is actuated, or within which range a comfortable operation is possible. The aim is to configure or fine-tune said marginal speed value such that many different drivers with many different comfort notions will not be negatively influenced in their comfort notions by the method for securing the braking effect. For example, a continuous application of the method for securing the braking effect can make it possible that only a little braking pressure is necessary in order to impede "fading" or "glazing" of the brake contact surfaces accordingly. Advantageously, the method for securing the braking effect may also be carried out also with a great emphasis on comfort for a driver by applying only one brake pad, for example. In order to nevertheless generate a sufficiently high braking pressure with said brake pad, a counterholder, consisting of a roll, for example, could be arranged at the opposite side, i.e. on that side, on which the other brake pad would normally be effective. This embodiment would preferably be used for a disc brake.

Advantageously, the drop of the actual speed of the vehicle below the marginal speed value is prevented by a dynamic load response of a main driving engine, in particular a combustion engine. Thus, preferably, a regulation, also known as torque control, is carried out, as it is known in a similar manner from the operation of an air-conditioning unit in combination with a combustion engine. The torque required for driving the air-conditioning compressor—i.e. in the present case the torque for compensating the braking pressure—is automatically provided by the combustion engine by a respective torque increase such that a driver will experience no reduction of the driving speed when switching on the air-conditioning unit. Transferred to the method for securing the braking effect, this means that a driver will not notice the actuation of the brake since the combustion engine will raise an additional torque compensating the brake force.

Advantageously, the dynamic load response of the combustion engine or an increase of the toque thereof may be used also in combination with other aspects, in particular in relation to the combustion engine. Thus, by increasing the load of the combustion engine, the specific efficiency thereof may be increased. It may also be advantageous to carry out strategies for exhaust after treatment, such as self-cleaning or burn-off of the particulate filter in a diesel engine, which often is also coupled with a dynamic load response, in combination with increasing the braking pressure.

Further preferably, an additional unit, in particular an electric, hydrostatic, pneumatic and/or hydraulic motor is used in order to prevent that the actual speed of the vehicle falls below the marginal speed value. To put it differently, thus, the additional motor of a hybrid vehicle can be used in order to counteract a braking pressure acting on the brake pads or brake contact surfaces by means of a dynamic load response or a torque increase and, thus, to avoid a reduction of the driving speed while carrying out the method for securing the braking effect. Advantageously, such an intervention is carried out in combination with or taking into account the battery management of the vehicle.

Preferably, the method further comprises the following step:

Processing additional data for determining and outputting the signal, wherein such data is generated from stored distance profiles or route profiles and/or preview data, in particular GPS data.

It may be advantageous to know the height profile of a route and to process and use it within the calculation unit for determining and outputting the signal. For example, for routes with much downward slope, the method for securing the braking effect can be optimally used, for example by consciously bypassing a retarder and/or by actuating the brakes, which are otherwise less used, i.e. rather tend to fade or glaze, such as the brakes of the rear axles. Further preferably, driver-specific user data is stored. For a driver, of whom it is known that he does brake very rarely, for example because he very often makes use of the engine brake, the method can be parametrized accordingly. Preferably, the method is provided with a self-learning function recognizing the driver's behavior and adapting the method for securing the braking effect accordingly. It may also be advantageous to take into account whether the vehicle is used in hot or cold areas. Something similar applies to the route condition. It may be advantageous not to carry out the method when the vehicle is passing through a very dusty region or when it is known that, subsequent to the pressure build-up and the resultant material removal and the heat input, the vehicle will pass through a very dusty region, for example. Dust particles could then more easily adhere or stick to the friction surfaces, when the latter are freshly treated, so to speak.

Expediently, the method additionally comprises the following step:

Designing the pressure build-up depending on the material of the friction surface and/or the brake contact surface.

In the case of brake pads or the friction surfaces thereof having different degrees of softness, also a varying pressure build-up may be required in order to achieve a sufficient material removal and/or heat input, which avoids "fading" or "glazing" of the brakes or brake pads. It may also be possible that certain brake pads fade or glaze more readily than others. Preferably, this is taken into account by the method, for example by taking into account and processing brake pad specific and/or also brake contact surface specific data for the method, for example in the calculation unit. If another type of brake pad is mounted after a brake pad replacement, this is advantageously input by means of an operator panel in the vehicle (or in the control device), for example, and can thus be further processed. Advantageously, the identification of the new brake pad may also be done automatically by means of an RFID chip integrated in and/or on the newly mounted brake pad.

Further preferably, the method comprises the following step:

Simulating the behavior of the brake by means of a simulation model in the calculation unit.

Expediently, in the simulation model of the brake, parts of the braking system or the entire braking system or the various components of the braking system are mirrored, by means of one or more physical models, characteristic diagrams and/or characteristic curves etc. Thus, to put it differently, the pressure build-up and the resultant braking pressure together with the consequences thereof can be precalculated, since in the simulation model there is present a brake having a brake contact surface and at least one brake pad comprising a friction surface. Preferably, such a simulation model can be used for service life precalculations of the brake and the components thereof. Preferably, such a simulation model is implemented such that it requires little storage space. Thus, it can easily be implemented in existing control devices, as they are now used in vehicles, in particular in utility vehicles. Preferably, also purely mathematical models can be used as simulation models, for example at least a polynomial model and/or at least a neural network. Such mathematical models could be trained preferably using the capturable data of the braking system. Preferably, also characteristic lines, characteristic diagrams, mathematical and/or physical models can be combined.

Further preferably, the method comprises the following step:

Attributing a friction parameter to the brake contact surface in the calculation unit, which parameter can be influenced by the material removal and/or the heat input such that the relation between braking effect and braking pressure can be increased.

To put it differently, thus a friction parameter can be attributed to the brake contact surface of a disc brake, for example, in the same manner as to the friction surface of a brake pad. To put it differently, thus, the mentioned advantages, which have been mentioned before, can also be applied specifically to the brake contact surface. The brake contact surface usually consists of a metal so that other pressures might be necessary here in order to influence the friction parameters thereof.

Further preferably, the method comprises the following step:

Further processing the signal to an acoustic, haptic and/or optical alarm signal, which is discernible for the driver.

It may be advantageous that such an alarm signal alerts the driver that a brake pad replacement or the like is imminent. Also preferably, such alarm signals are stored in the vehicle's control device, from where they can be further processed or read out at a later time. It may also be preferred that the method for securing the braking effect is also actively carried out when the driver or user desires so, by actuating a switch, for example.

Further advantages and features become apparent from the following description of a preferred embodiment and a preferred method variant of the method according to the invention for securing the braking effect of a brake, with reference to the appended Figures. Individual features of the embodiment and of the method variant may be combined with each other within the scope of the invention.

BRIEF DESCRIPTION OF THE DRAWINGS

The Figures show.

DETAILED DESCRIPTION OF THE PREFERRED EMBODIMENTS

Figure 1:
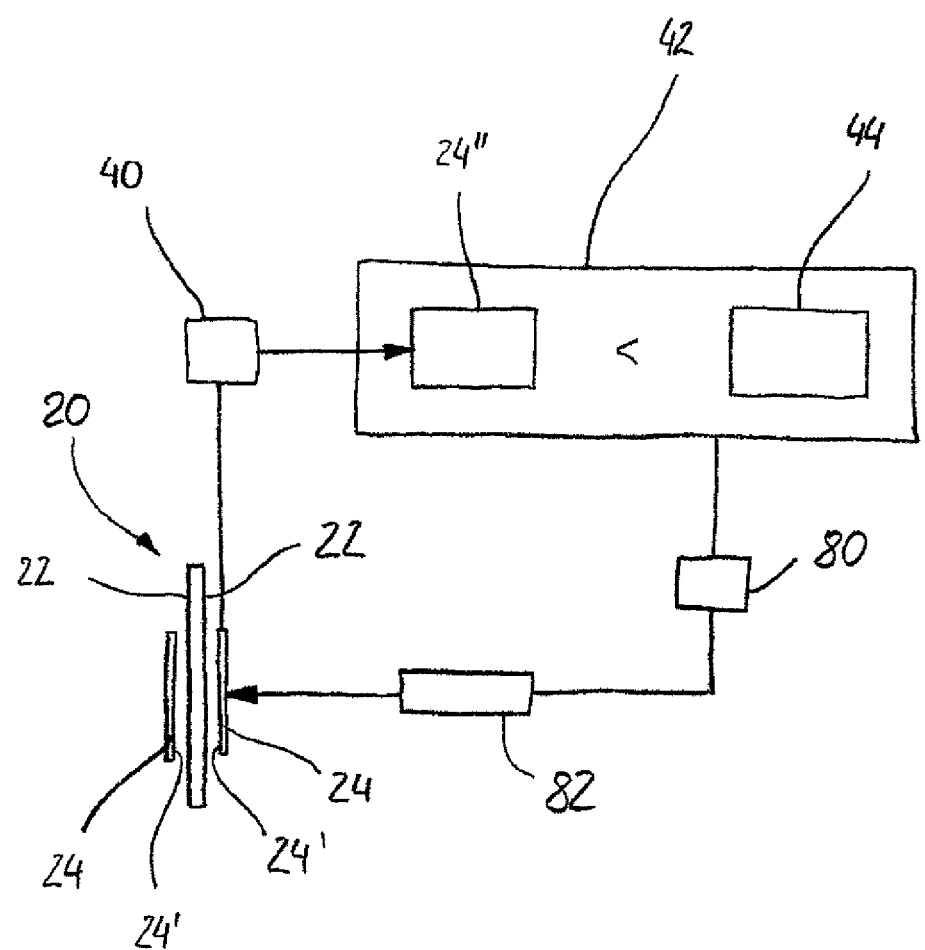
FIG. 1 an overview of various components of a preferred embodiment of the method for securing the braking effect.

FIG. 1 shows an overview of various components of a preferred embodiment of the method for securing the braking effect. A brake 20 comprising two brake contact surfaces 22 is shown. Two brake pads 24, each having at least one friction surface 24', are arranged such that they face the brake contact surfaces 22. In the preferred embodiment shown in FIG. 1 of various components for carrying out the method for securing the braking effect, the connection between the brake pad 24 and the calculation unit 40 illustrates the capturing of the braking effect of the brake. In the calculation unit 40, the braking effect is attributed to a friction parameter 24". In the comparator 42, it is investigated or compared whether the friction parameter 24" is smaller than a marginal braking effect 44. Depending on this comparison a signal 80 is output, which results in a pressure build-up 82. Said pressure build-up acts on the brake 20 or the brake pads 24 and causes a friction force build-up 82 or a braking pressure build-up between the brake contact surfaces 22 and the friction surfaces 24'. As a matter of course, the brake 20 is part of a vehicle and the brake contact surfaces 22 as such are connected to a wheel, by means of which the brake force can finally be transmitted to a roadway.

Figure 2:
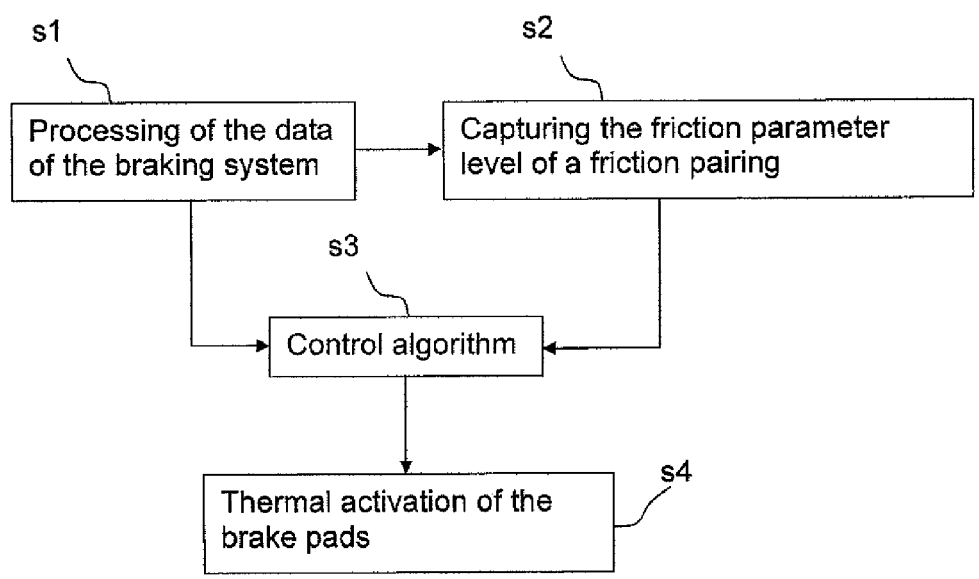
FIG. 2 a preferred method variant of the method for securing the braking effect.

FIG. 2 shows a preferred method variant of the method for securing the braking effect. Step s1 includes the processing of the data of the braking system. Here, the idea is that the data captured already today of a braking system, in particular of an electronic braking system, such as the vehicle retardation in dependence on the braking pressure, possibly also the cylinder stroke and the geometric parameters from the brake calculation, are used to indirectly determine the friction parameter level and to early recognize the tendency of a drop of the friction parameter over the time. This makes possible step s2, i.e. the capturing of the friction parameter level of the friction pairing. Step s1 needs not necessarily be put in front of step s1. The capturing of the friction parameter level of the friction pairing can also be done directly from sensor values installed in the vehicle, which need not necessarily be (further) processed. It is also possible to make further use of data generated in step s1 directly in step s3, i.e. in the control algorithm. For example, the data of capturing wear on the brake pads and capturing the distance traveled as well as the previous load profile may very well be used for estimating the remaining brake pad service life and be further processed in the control algorithm. Finally, detecting the drop of the friction parameter by means of a respective control algorithm (cf. s3) stored in the braking system, by a purposeful slight application of individual brakes or axles, serves to automatically (without the driver's influence) thermally reactivate the brake pads and to not allow the friction coefficient level to fall below a defined limit. The frequency of the brake applications and the pressure level of the brake applications may also be used as criteria in order to start an automatic activation program for the brake pads (s4). Thus, it may also be ensured that safety or assistance systems accessing the wheel brake can work in the optimum range. In case the friction coefficient level permanently falls below the defined limit, a warning notice to the driver and a possible deactivation of the assistance systems (including confirmation by the driver) could help to avoid that the driver unconsciously gets into a situation, where he relies on or assumes that the systems function without failure although this is no longer ensured.

LIST OF REFERENCE SIGNS 20 brake
22 brake contact surface
24 brake pad
24' friction surface
24" friction parameter
40 calculation unit
42 comparator
44 marginal braking effect
80 signal
82 pressure build-up
s1-s4 method steps

The invention claimed is:

1. A method for securing a braking effect of a brake of a utility vehicle in driving mode, wherein the brake comprises at least one brake contact surface and at least one of a brake pad and a brake lining comprising a friction surface, wherein the braking effect between the brake contact surface and the friction surface is caused by a braking pressure acting between the brake contact surface and the friction surface, the method comprising:
    capturing the braking effect of the brake;
    attributing the braking effect to a friction parameter of the friction surface in a calculation unit, wherein the calculation unit precalculates a drop of a friction coefficient;
    and comparing the friction parameter of a marginal braking effect in a comparator, wherein a signal is output to the brake when it falls below the marginal braking effect, which signal causes a braking pressure and a friction force between the brake contact surface and the friction surface at least one of directly and indirectly by pressure build-up, whereby the friction parameter of the friction surface is brought above the marginal braking effect when the braking pressure and the friction force on at least one of the friction surface and the brake contact surface obtain at least one of a material removal and a heat input, by which a relation between braking effect and braking pressure can be increased.

2. The method of claim 1, further comprising:
    providing a marginal speed value of a vehicle and regulating the pressure build-up such that an actual speed of the vehicle will not fall below the marginal speed value.

3. The method of claim 2, wherein a drop of the actual speed of the vehicle below the marginal speed value is prevented by a dynamic load response of a main driving engine.

4. The method of claim 3, wherein the main driving engine comprises a combustion engine.

5. The method of claim 3, wherein an additional unit separate from the main driving engine is used in order to prevent that the actual speed of the vehicle falls below the marginal speed value.

6. The method of claim 5, wherein the additional unit comprises at least one of an electric, hydrostatic, pneumatic and hydraulic motor.

7. The method of claim 5, further comprising:
    processing additional data for determining and outputting the signal, wherein the data is generated from at least one of stored distance profiles and preview data.

8. The method of claim 7, wherein the preview data comprises GPS data.

9. The method of claim 7, further comprising:
    calculating the pressure build-up depending on the material of at least one of the friction surface and of the brake contact surface.

10. The method of claim 9, further comprising:
    simulating a behavior of the brake by means of a simulation model in the calculation unit.

11. The method of claim 10, further comprising:
    attributing a friction parameter to the brake contact surface in the calculation unit, which parameter can be influenced by at least one of the material removal and/or the heat input such that the relation between braking effect and braking pressure can be increased.

12. The method of claim 11, further comprising:
    processing the signal to at least one of an acoustic, haptic and optical alarm signal, which is discernible by the driver.

13. The method of claim 12, wherein the calculation unit calculates for a drop of the friction coefficient.

14. The method of claim 13, wherein different marginal speed values can be fixed depending on a field of use of the vehicle and an operational profile thereof.

15. The method of claim 14, wherein the method is provided with a self-learning unit recognizing a driver's behavior and accordingly adapting the method for securing the braking effect.

16. The method of claim 15, wherein the pressure build-up is not initiated by a driver.

17. The method of claim 1, further comprising:
processing additional data for determining and outputting the signal, wherein data is generated from at least one of stored distance profiles and preview data.

18. The method of claim 17, wherein the preview data comprises GPS data.

19. The method of claim 1, further comprising:
calculating the pressure build-up depending on the material of at least one of the friction surface and of the brake contact surface.

20. The method of claim 1, further comprising:
simulating the behavior of the brake by means of a simulation model in the calculation unit.

21. The method of claim 1, further comprising:
attributing a friction parameter to the brake contact surface in the calculation unit, which parameter can be influenced by at least one of the material removal and the heat input such that the relation between braking effect and braking pressure can be increased.

22. The method of claim 1, further comprising:
processing the signal to at least one of an acoustic, haptic and optical alarm signal, which is discernible by the driver.

23. The method of claim 1, wherein the calculation unit calculates for a drop of the friction coefficient.

24. The method of claim 1, wherein the method is provided with a self-learning unit recognizing a driver's behavior and accordingly adapting the method for securing the braking effect.

25. The method of claim 1, wherein the pressure build-up is not initiated by a driver.

* * * * *